US010110828B2

(12) United States Patent
Kim et al.

(10) Patent No.: US 10,110,828 B2
(45) Date of Patent: Oct. 23, 2018

(54) PHOTOGRAPHING APPARATUS AND METHOD FOR CONTROLLING PHOTOGRAPHING APPARATUS

(71) Applicant: LG ELECTRONICS INC., Seoul (KR)

(72) Inventors: Kwanhyung Kim, Seoul (KR); Youngman Kwon, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 15/567,072

(22) PCT Filed: Apr. 1, 2016

(86) PCT No.: PCT/KR2016/003412
§ 371 (c)(1),
(2) Date: Oct. 16, 2017

(87) PCT Pub. No.: WO2016/167499
PCT Pub. Date: Oct. 20, 2016

(65) Prior Publication Data
US 2018/0103185 A1    Apr. 12, 2018

(30) Foreign Application Priority Data
Apr. 17, 2015  (KR) .................. 10-2015-0054223

(51) Int. Cl.
*H04N 5/225*        (2006.01)
*H04N 5/235*        (2006.01)
(Continued)

(52) U.S. Cl.
CPC ......... *H04N 5/2353* (2013.01); *H04N 5/2258* (2013.01); *H04N 5/23293* (2013.01); *H04N 5/243* (2013.01); *H04N 17/002* (2013.01)

(58) Field of Classification Search
CPC ................................................ H04N 1/1906
(Continued)

(56) References Cited

U.S. PATENT DOCUMENTS

2003/0025813 A1*  2/2003  Yoshiwara ........... H04N 5/2176
                                                348/246
2003/0043286 A1*  3/2003  Kato ..................... H04N 5/3675
                                                348/246
(Continued)

FOREIGN PATENT DOCUMENTS

JP    2005204196    7/2005
JP    2006174316    6/2006
(Continued)

OTHER PUBLICATIONS

PCT International Application No. PCT/KR2016/003412, International Search Report dated Jul. 8, 2016, 8 pages.
(Continued)

*Primary Examiner* — Twyler Lamb Haskins
*Assistant Examiner* — Dwight Alex C Tejano
(74) *Attorney, Agent, or Firm* — Lee, Hong, Degerman, Kang & Waimey PC

(57) ABSTRACT

Photographing apparatus and method for controlling the photographing apparatus are disclosed. The present invention comprises: a lens; a beam splitter; a first image sensor for outputting first image data; a second image sensor for outputting second image data; a display unit for displaying the first image data; and a control unit for correcting the pixel value of at least a part of the first image data displayed on the display unit on the basis of brightness information obtained from the second image data, and when a malfunction of the first image sensor is detected, adjusting the exposure value of the second image sensor to the exposure value of the first image sensor and displaying the second
(Continued)

image data on the display unit. According to the present invention, a photographed image can be improved, and an image can be stably output even when an image sensor in a photographing apparatus malfunctions.

10 Claims, 15 Drawing Sheets

(51) Int. Cl.
 *H04N 5/232* (2006.01)
 *H04N 17/00* (2006.01)
 *H04N 5/243* (2006.01)
(58) Field of Classification Search
 USPC ........................................................ 348/246
 See application file for complete search history.

(56) References Cited

U.S. PATENT DOCUMENTS

| | | | | |
|---|---|---|---|---|
| 2003/0048493 A1* | 3/2003 | Pontifex | ............... | H04N 5/243 358/514 |
| 2005/0195290 A1* | 9/2005 | Takeshita | ............... | H04N 9/735 348/223.1 |
| 2006/0034487 A1 | 2/2006 | Franz | | |
| 2007/0132567 A1 | 6/2007 | Schofield et al. | | |
| 2008/0036883 A1* | 2/2008 | Hara | ..................... | H04N 5/367 348/246 |
| 2008/0303927 A1 | 12/2008 | Khanh | | |
| 2009/0285573 A1* | 11/2009 | Aoyagi | .................. | G03B 15/03 396/157 |
| 2013/0100332 A1* | 4/2013 | Kim | ...................... | G03B 19/12 348/335 |
| 2013/0128072 A1 | 5/2013 | Kobayahi | | |

FOREIGN PATENT DOCUMENTS

| | | |
|---|---|---|
| JP | 2011223264 | 11/2011 |
| KR | 1020080022694 | 3/2008 |

OTHER PUBLICATIONS

European Patent Office Application Serial No. 16780222.2, Search Report dated Aug. 27, 2018, 7 pages.

* cited by examiner

FIG. 4
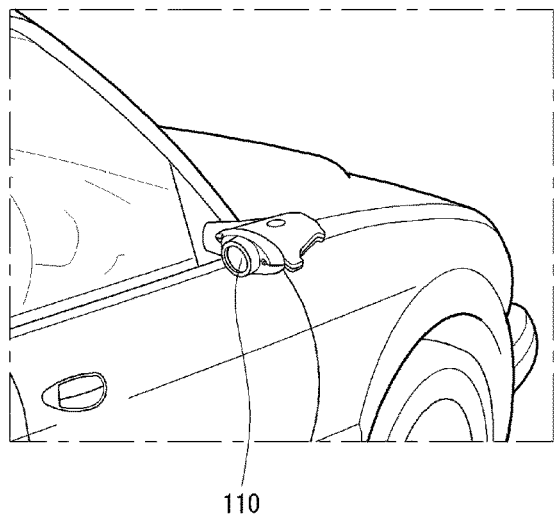
FIG. 5
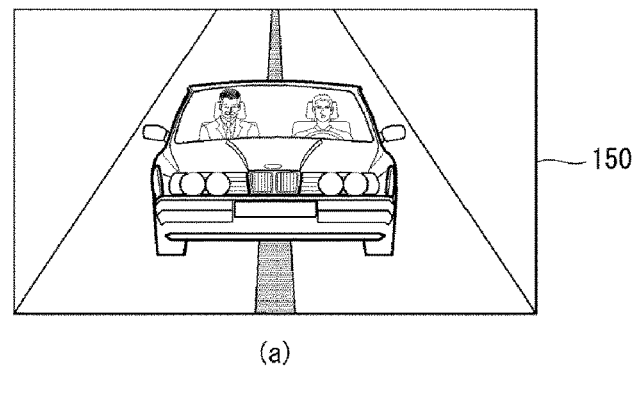
(a)
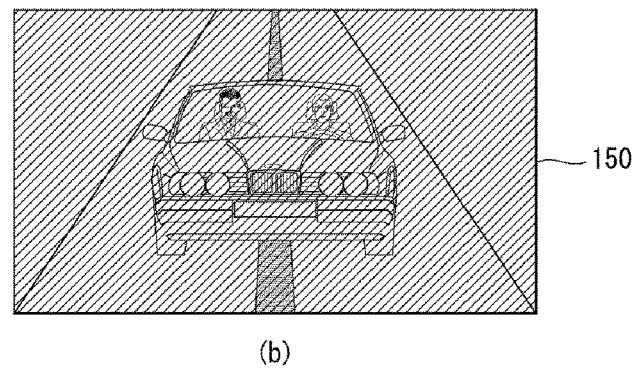
(b)

PHOTOGRAPHING APPARATUS AND METHOD FOR CONTROLLING PHOTOGRAPHING APPARATUS

CROSS-REFERENCE TO RELATED APPLICATIONS

This application is the National Stage filing under 35 U.S.C. 371 of International Application No. PCT/KR2016/003412, filed on Apr. 1, 2016, which claims the benefit of earlier filing date and right of priority to Korean Application No. 10-2015-0054223, filed on Apr. 17, 2015, the contents of which are all hereby incorporated by reference herein in their entirety.

TECHNICAL FIELD

The present invention relates to a method for controlling a photographing apparatus and, more particularly, to a photographing apparatus capable of securing operational stability and a method for controlling the same.

BACKGROUND ART

Recently, an image obtaining technologies using cameras have been extensively applied to various fields. For example, for driver's convenience, cameras are installed in vehicles for various purposes and development of related technologies has been explosively increased. However, with respect to some functions, if a camera does not normally operate, safety may be severely affected, and thus, in this case, the camera may not be used without a solution related thereto.

For example, in the case of around view monitoring (AVM), a camera used as a substitute for a side mirror, a fault of a function thereof may directly relate to life of a driver of a corresponding vehicle or a pedestrian, so stability of operation needs to be secured.

Also, a vehicle camera may be frequently exposed to very bright lighting such as light of the sun, a headlamp, and the like, in terms of characteristics thereof. In this situation, in the related art, sensitivity of a sensor is lowered to obtain a dark image such that other parts than lighting is impossible to recognize. Thus, a technique for improving an image in this situation is required.

SUMMARY OF INVENTION

Technical Problem

The present disclosure has been made to solve the above-mentioned problems and any other problems. An aspect of the present disclosure provides a photographing apparatus (or an imaging apparatus) capable of improving a captured image (or a photographed image) and stably outputting an image even when an image sensor of the photographing apparatus malfunctions, and a method for controlling the same.

Technical Solution

In an aspect, a photographing apparatus includes: a lens; a beam splitter splitting light passing through the lens into light in a first direction and light in a second direction; a first image sensor sensing light traveling in the first direction and outputting first image data; a second image sensor having an exposure value different from that of the first image sensor, sensing light traveling in the second direction, and outputting second image data; a display unit displaying the first image data; and a controller correcting pixel values of at least a partial region of the first image data displayed on the display unit on the basis of brightness information obtained from the second image data, and adjusting, when malfunction of the first image sensor is detected, the exposure value of the second image sensor with the exposure value of the first image sensor to display the second image data on the display unit.

The controller may detect malfunction of the first image sensor according to whether the first image data is received.

The controller may detect malfunction of the first image sensor according to whether an operation signal is received from the first image sensor.

When a difference between the first image data and the second image data is equal to or greater than a preset reference, the controller may detect that the first image sensor malfunctions.

The controller may obtain the difference by detecting edges of subjects included in the first image data and the second image data or comparing keypoints of the first image data and the second image data.

The controller may detect malfunction of the first image sensor according to whether colors of the first image data include types of a predetermined reference.

When malfunction of the first image sensor is detected, the controller may output a malfunction notification signal on the display unit.

The controller may adjust the exposure value of the first image sensor on the basis of brightness information obtained from the second image data.

The controller may adjust the exposure value of the first image sensor and the exposure value of the second image sensor to be contrasted, and synthesize the first image data and the second image data to display synthesized image data on the display unit.

In another aspect, a method for controlling a photographing apparatus includes: splitting light passing through a lens into light in a first direction and light in a second direction; sensing light traveling in the first direction using the first image sensor and outputting first image data; sensing light traveling in the second direction using a second image sensor having an exposure value different from that of the first image sensor, and outputting second image data; displaying the first image data on a display unit; correcting pixel values of at least a partial region of the first image data displayed on the display unit on the basis of brightness information obtained from the second image data; and when malfunction of the first image sensor is detected, adjusting the exposure value of the second image sensor to display the second image data on the display unit.

Advantageous Effects

Advantages and effects of the photographing apparatus and the method for controlling the same are as follows.

According to at least one of the embodiments of the present disclosure, a captured image may be improved and, even when an image sensor within the photographing apparatus malfunctions, an image may be stably output.

Also, according to at least one of the embodiments of the present disclosure, malfunction of the image sensor may be detected in various manners, operational stability of the photographing apparatus may be secured.

Also, According to at least one of the embodiments of the present disclosure, when malfunction of the first image sensor is detected, an image from the second image sensor may be displayed by adjusting an exposure value of the second image sensor, whereby operational stability of the photographing apparatus may be secured.

Also, According to at least one of the embodiments of the present disclosure, an exposure value of the first image sensor may be adjusted on the basis of brightness information obtained from the second image data.

Also, According to at least one of the embodiments of the present disclosure, since the exposure values of the first image sensor and the second image sensor are adjusted to be contrasted, the entire displayed image may have appropriate exposure values.

An additional scope of applicability of the present invention shall become obvious from the detailed description in the following. It is to be understood that both the foregoing general description and the following detailed description of the preferred embodiments of the present invention are exemplary and explanatory and are intended to provide further explanation of the invention as claimed.

DESCRIPTION OF DRAWINGS

FIG. 4 is a view illustrating utilization of a photographing apparatus according to an example of the present disclosure.

FIG. 5 is a view illustrating a difference in exposure value between a first image sensor and a second image sensor according to an example of the present disclosure.

BEST MODE

Mode for Invention

Description will now be given in detail according to exemplary embodiments disclosed herein, with reference to the accompanying drawings. For the sake of brief description with reference to the drawings, the same or equivalent components may be provided with the same reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. In the present disclosure, that which is well-known to one of ordinary skill in the relevant art has generally been omitted for the sake of brevity. The accompanying drawings are used to help easily understand various technical features (or singularities) and it should be understood that the embodiments presented herein are not limited by the accompanying drawings. As such, the present disclosure should be construed to extend to any alterations, equivalents and substitutes in addition to those which are particularly set out in the accompanying drawings.

It will be understood that although the terms first, second, etc. may be used herein to describe various elements, these elements should not be limited by these terms. These terms are generally only used to distinguish one element from another.

It will be understood that when an element is referred to as being "connected with" another element, the element can be connected with the other element or intervening elements may also be present. In contrast, when an element is referred to as being "directly connected with" another element, there are no intervening elements present.

A singular representation may include a plural representation unless it represents a definitely different meaning from the context.

Terms such as "include" or "has" are used herein and should be understood that they are intended to indicate an existence of several components, functions or steps, disclosed in the specification, and it is also understood that greater or fewer components, functions, or steps may likewise be utilized.

Figure 1:
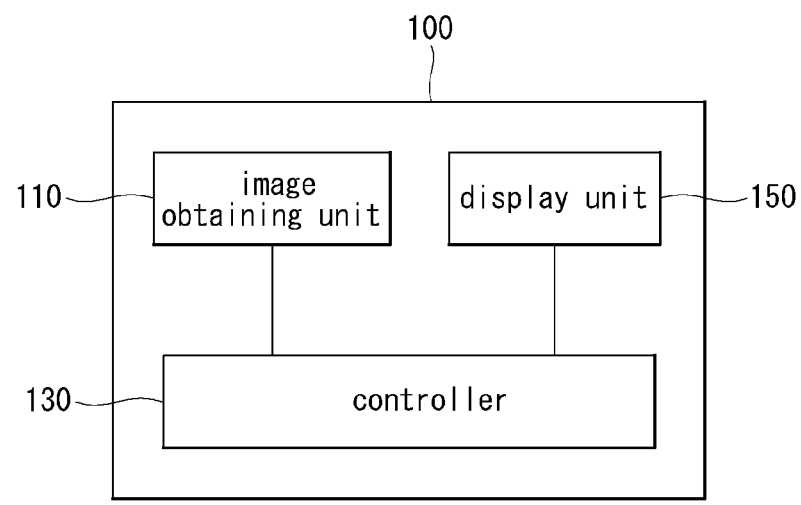
FIG. 1 is a block diagram illustrating a photographing apparatus related to the present disclosure.
Figure 2:
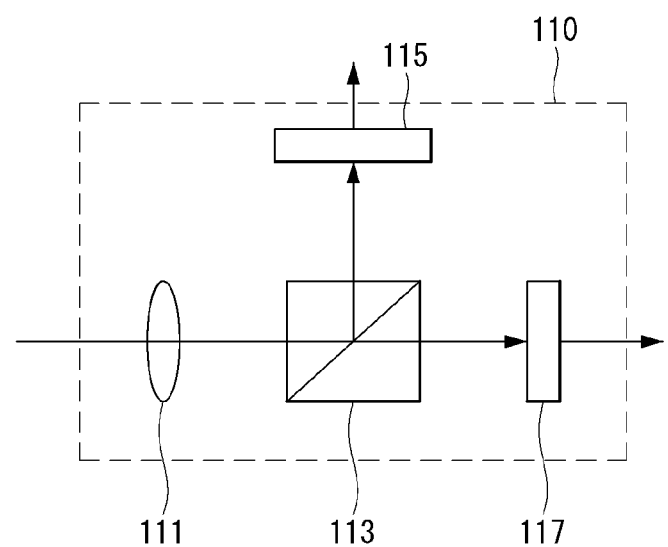
FIG. 2 is a block diagram illustrating an image obtaining unit according to an example of the present disclosure.

FIG. 1 is a block diagram illustrating a photographing apparatus related to the present disclosure, and FIG. 2 is a block diagram illustrating an image obtaining unit according to an example of the present disclosure.

Referring to FIG. 1, a photographing apparatus 100 may include an image obtaining unit 110, a controller 130, and a display unit 150. The components illustrated in FIG. 1 are not essential to implement the photographing apparatus, and the photographing apparatus described in this disclosure may have greater or fewer components.

In detail, among the foregoing components, the image obtaining unit 110 processes an image frame such as a still image, video, and the like, obtained through an image sensor (e.g., a CCD, CMOS, etc.). Referring to FIG. 2, the image obtaining unit 110 may include a lens 111, a beam splitter 113, a first image sensor 115, and a second image sensor 117.

The lens 111 may collect light introduced from the outside. Light passing through the lens 111 may be split by the beam splitter 113 into light in a first direction and light in a second direction. The beam splitter 113 refers to a reflector or any other optical device reflecting a partial amount of introduced light and allowing another partial amount of the introduced light to transmit therethrough, and may be any device as long as it can split introduced light to different paths, regardless of name or type.

The first image sensor 115 may sense light traveling in the first direction and output first image data. The second image sensor 117 may sense light traveling in the second direction and output second image data. Sensing light and converting the sensed light into image data follows a known method, and thus, a detailed description thereof will be omitted.

Referring to FIG. 2, the first direction in which the first image sensor 115 is provided is illustrated as a path in which light reflected from the beam splitter 113 travels. Also, the second direction in which the second image sensor 117 is provided is illustrated as a path in which light transmitting through the beam splitter 113 travels.

This, however, merely an example and the present disclosure is not limited thereto. Contrary to that illustrated in FIG. 2, the first direction may be set as a direction in which light transmitting through the beam splitter 113 travels and the second direction may be set as a direction in which light reflected from the beam splitter 113 travels.

The photographing apparatus 100 may further include a component for processing the image data obtained by the image obtaining unit 110 and outputting processed data to the controller 130. However, processing such as converting a format of image data follows a known method, and thus, a detailed description thereof will be omitted.

Referring back to FIG. 1, the display unit 150 may display the first image data or the second image data. Or, the display unit 150 may display image data generated using the first image data and the second image data.

Hereinafter, embodiments related to a control method which may be implemented in the photographing apparatus configured as described above will be described with reference to the accompanying drawings. The present disclosure may be materialized in a specific form without departing from the spirit and essential characteristics of the present invention.

Figure 3:
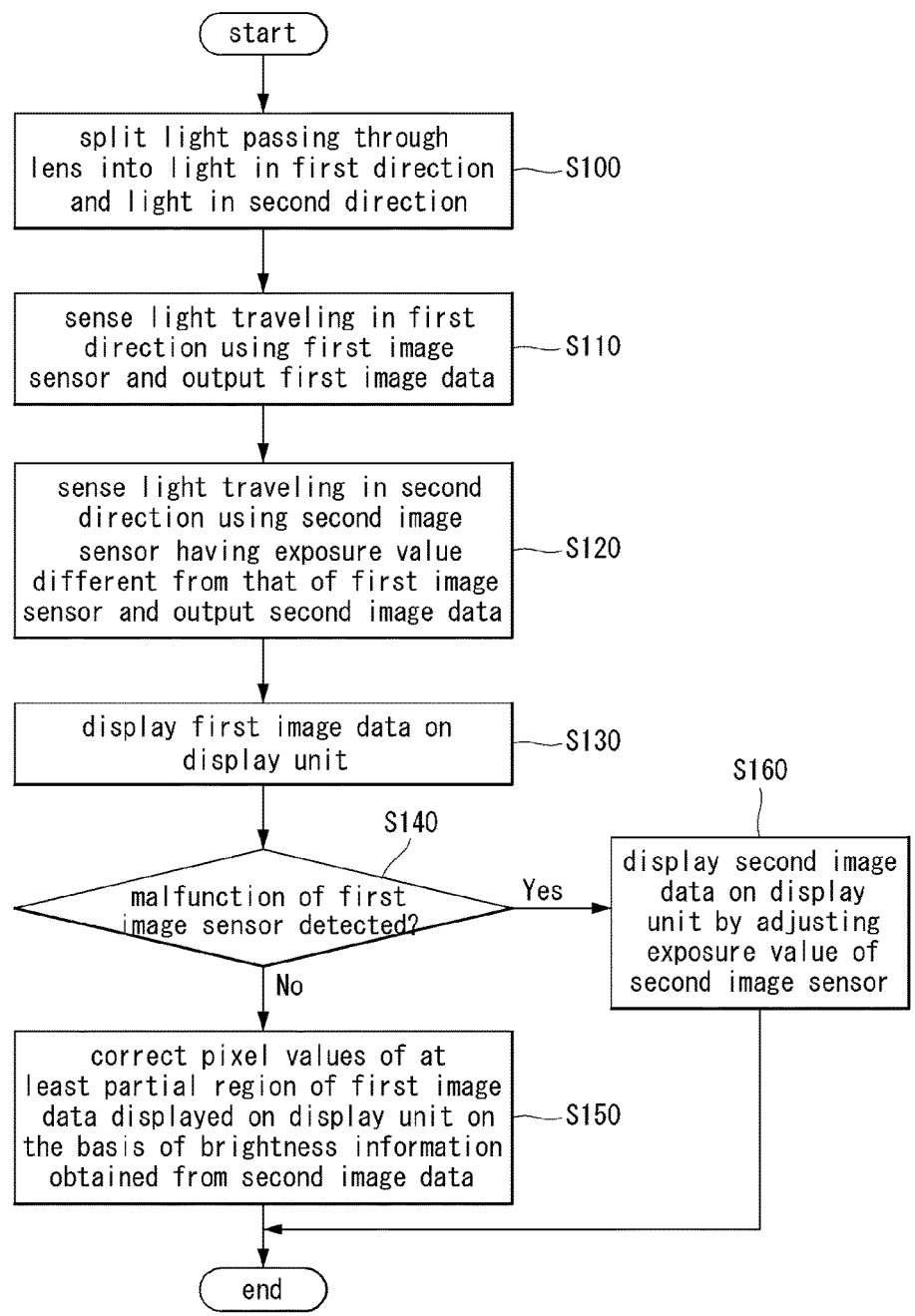
FIG. 3 is a flow chart illustrating a method for controlling a photographing apparatus according to an example of the present disclosure.

FIG. 3 is a flow chart illustrating a method for controlling a photographing apparatus according to an example of the present disclosure. FIG. 4 is a view illustrating utilization of a photographing apparatus according to an example of the present disclosure. FIG. 5 is a view illustrating a difference in exposure value between a first image sensor and a second image sensor according to an example of the present disclosure.

The method for controlling a photographing apparatus according to an example of the present disclosure may be implemented in the photographing apparatus 100 described above with reference to FIGS. 1 and 2. Hereinafter, the method for controlling a photographing apparatus according to an example of the present disclosure and an operation of the photographing apparatus 100 for implementing the same will be described in detail with reference to related drawings.

Referring to FIG. 3, the beam splitter 113 splits light which has passed through the lens 111 into light of the first direction and light of the second direction (S100), and the first image sensor 115 senses light traveling in the first direction and output first image data (S110).

Also, the second image sensor 117 may sense light traveling in the second direction and output second image data (S120). Outputting image data has been described above with reference to FIGS. 1 and 2, and thus, a detailed description thereof will be omitted.

Referring to FIG. 4, it is illustrated that the image obtaining unit 110 is provided in the place of a side mirror of a vehicle. This, however, is merely an example and the present disclosure is not limited thereto. The image obtaining unit 110 may also be provided in various other devices than the vehicle or may also be applied to a photographing apparatus itself.

According to an example, the first image sensor 115 and the second image sensor 117 may be set to have different exposure values. For example, an exposure value of the first image sensor 115 may be set to an exposure value appropriate when an image is captured. The exposure value appropriate when an image is captured may be an exposure value by which captured image data may be displayed to be most similar to an actual unique color of objects displayed when captured image data is displayed on the display unit 150. In an example, the first image sensor 115 may be set to automatic exposure.

Referring to (a) of FIG. 5, an example of the first image data is illustrated. As illustrated in (a) of FIG. 5, except for a special case such as cases where an amount of light equal to or greater than a predetermined threshold value is introduced to the first image sensor 115 or in the case of backlight, each object of the first image data may appear in a unique color.

Here, an exposure value of the second image sensor 117 may be set to an exposure value most appropriate for obtaining brightness information of image data. Brightness information of image data may be information of an amount of light regarding each pixel of an image obtained by an image sensor. In an example, the second image sensor 117 may be set to fixed exposure to have a predetermined exposure value.

Referring to (b) of FIG. 5, an example of the second image data is illustrated. As described above, when the second image sensor 117 is set to a fixed exposure value, the second image sensor 117 may obtain the second image data, regardless of an appropriate exposure value for image capturing. Thus, in a case where an amount of light introduced to the second image sensor 117 is small, an overall dark second image data may be obtained as illustrated in (b) of FIG. 5. Shading of (b) of FIG. 5 indicates an image darker than that of (a) of FIG. 5. However, this is merely an example and, conversely, when a large amount of light is introduced to the second image sensor 117, overall bright second image data may be obtained.

Referring back to FIG. 3, the controller 130 may display the first image data on the display unit 150 (S130).

The controller 130 may display, on the display unit 150, the first image data obtained from the first image sensor 115 set to have an appropriate exposure value for image capturing. For example, in a case where the image obtaining unit 110 is provided in the side mirror as illustrated in FIG. 4, a driver may drive, while viewing first image data displayed on the display unit 150 provided within the vehicle, instead of the right side mirror.

Referring back to FIG. 3, the controller 130 may detect malfunction of the first image sensor 115 (S140).

Malfunction of the first image sensor 115 may refer to a case where the first image cannot be normally displayed on the display unit due to a fault of the first image sensor 115, or the like. For example, malfunction may correspond to a case where only noise is displayed on the display unit 150 or a case where the first image data appears as black and white in color.

However, the present disclosure is not limited thereto and malfunction may refer to every case where the first image data is not normally displayed on the display unit 150. In an example, the controller 130 may also detect malfunction of the second image sensor 117, while detecting malfunction of the first image sensor 115. Detection of malfunction of the image sensor will be described in detail with reference to FIG. 6 and the following drawings.

Referring back to FIG. 3, the controller 130 may correct pixel values of at least a partial region of the first image data displayed on the display unit 150 on the basis of the brightness information obtained from the second image data (S150).

When malfunction of the first and second image sensors 115 and 117 is not detected, the first image data may be displayed on the display unit 150. Here, the controller 130 may obtain brightness information from the second image data. The brightness information may be information regarding an amount of light (or light amount information) of the second image data sensed by pixels by the second image sensor 117.

The controller 130 may correct values such as brightness, hue, chroma, and the like, regarding a color by pixels on the basis of the light amount information of the second image data. Since exposure values of the first image sensor 115 and the second image sensor 117 are set to be different, each image data may have a different pixel value with respect to the same target (or object). By correcting at least some pixel values of the first image data using the second image data, the controller 130 may display the first image data with appropriate brightness, hue, saturation, and the like.

Regarding correction of the first image data, information regarding a color is corrected by pixels, but the present disclosure is not limited thereto. Any method may be employed to correct the foregoing first image data as long as it can improve an image using separate light amount information, regardless of name, or the like. Image improvement will be described in detail with reference to FIG. 15 and the following drawings hereinafter.

Referring back to FIG. 3, when malfunction of the first image sensor 115 is detected, the controller 130 may adjust an exposure value of the second image sensor 117 to display the second image data on the display unit 150 (S160).

When malfunction of the first image sensor 115 is detected, the controller 130 may display the second image data on the display unit 150. Here, since an exposure value of the second image sensor 117 has been set to an exposure value most appropriate for obtaining brightness information of image data, if the image data is displayed as is, it may be difficult to recognize.

Thus, the controller 130 may adjust the exposure value of the second image sensor 117 to an exposure value appropriate when an image is captured. Here, the controller 130 may adjust the exposure value of the second image sensor 117 with the exposure value of the first image sensor 115.

Accordingly, the second image data captured with the same exposure value as that of the first image data may be displayed on the display unit 150.

Accordingly, although malfunction of the first image sensor 115 occurs, the user may stably be provided with an image from the second image sensor 117 having the same image characteristics, through the display unit 150. Also, when the first image sensor 115 normally operates, the user may be provided with improved first image data using the second image data.

Figure 6:
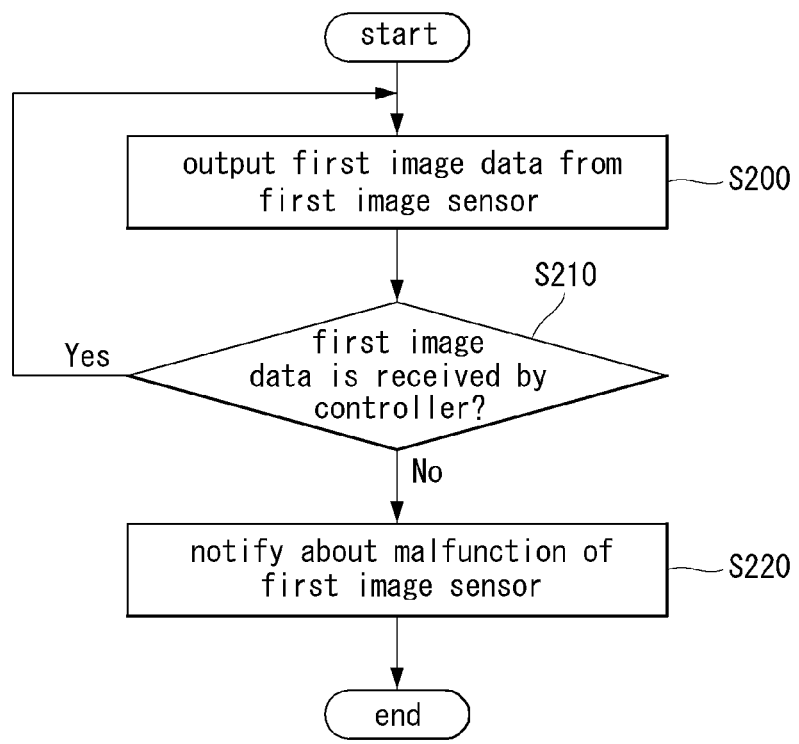
FIG. 6 is a flow chart illustrating a method for detecting malfunction according to whether first image data is received according to an example of the present disclosure.
Figure 7:
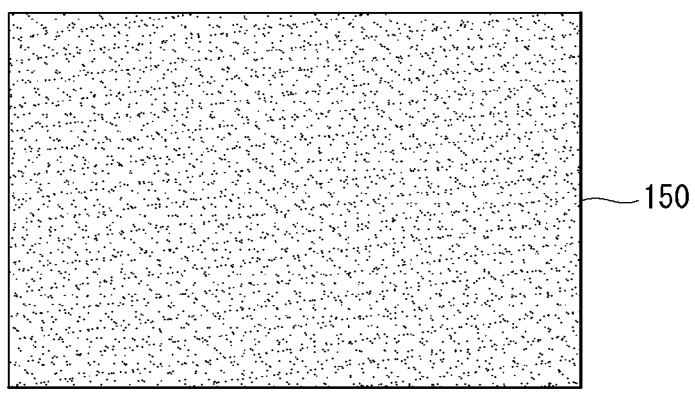
FIGS. 7 and 8 are views illustrating detection of malfunction according to whether first image data is received according to an example of the present disclosure.
Figure 8:
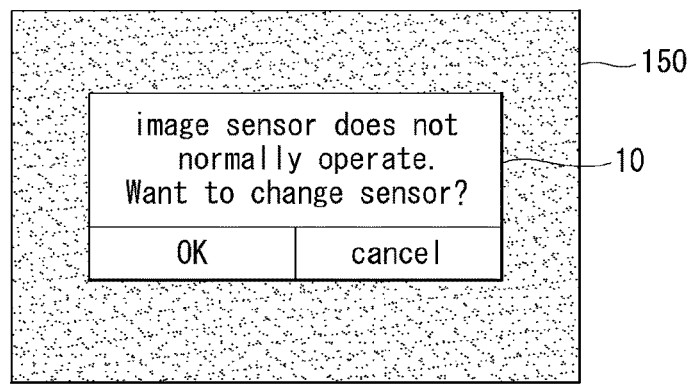

FIG. 6 is a flow chart illustrating a method for detecting malfunction according to whether first image data is received according to an example of the present disclosure. FIGS. 7 and 8 are views illustrating detection of malfunction according to whether first image data is received according to an example of the present disclosure.

Referring to FIG. 6, when the first image sensor 115 outputs first image data (S200), the controller 130 may receive the first image data. The controller 130 may detect whether the first image sensor 115 malfunctions depending on whether the first image data is received (S210).

In FIG. 7, it is illustrated that a noise signal is output on the display unit 150. When the first image data is not received by the controller 130, the first image data may not normally be displayed on the display unit 150. FIG. 7 illustrates an example of an output noise signal, but the present disclosure is not limited to a form thereof.

The controller 130 determines whether the first image data is received, and when the first image data is not received, the controller 130 may determine that the first image sensor 115 malfunctions. When malfunction of the first image sensor 115 is detected, the controller 130 may output a malfunction notification signal 10 on the display unit 150 as illustrated in FIG. 8 (S220).

However, the present disclosure is not limited thereto and the malfunction notification signal 10 may be displayed in a different form on the display unit 150. Also, according to an example, an audio output unit (not shown) or a haptic module (not shown) may be further provided in the photographic apparatus 100 to output the malfunction notification signal 10 as a specific sound or vibration.

The user may select change of an image sensor in the malfunction notification signal 10. Here, the controller 150 may display the second image data on the display unit 150 by adjusting an exposure value of the second image sensor 117. However, the present disclosure is not limited thereto and according to an example, the controller 150 may first display the second image data on the display unit 150, regardless of user selection. Thereafter, the controller 150 may output the malfunction notification signal 10 in order to inform about whether the first image sensor has a fault.

So far, malfunction of the first image sensor 115 has been described but the substantially same descriptions may also be applied to the second image sensor 117. The controller 130 may detect whether the second image sensor 117 malfunctions by determining whether the second image data is received.

Also, when malfunction of the second image sensor 117 is detected, the controller 130 may output a malfunction notification signal on the display unit 150. Also, in this case, the malfunction notification signal may be output as a specific sound or vibration through an audio output unit (not shown) or a haptic module (not shown) provided in the photographing apparatus 100.

In this manner, the user may recognize whether the image sensor malfunctions by intuition, and may be rapidly provided with a normal image. Also, even when the second image sensor has a fault, the fault may be immediately checked and the second image sensor may be easily replaced.

Figure 9:
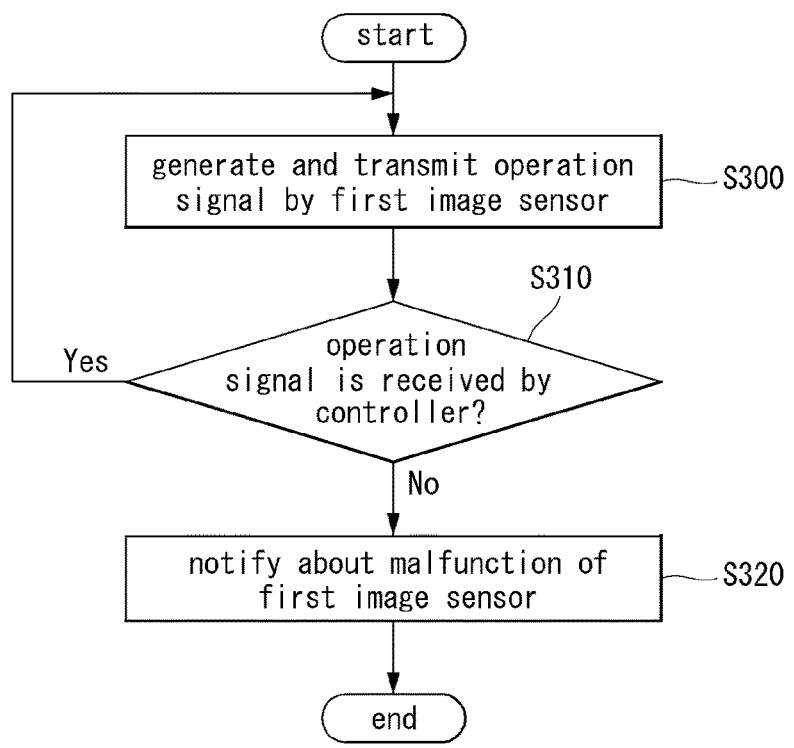
FIG. 9 is a flow chart illustrating a method for detecting malfunction according to whether an operation signal of a first image sensor is received according to an example of the present disclosure.

FIG. 9 is a flow chart illustrating a method for detecting malfunction according to whether an operation signal of a first image sensor is received according to an example of the present disclosure.

Referring to FIG. 9, the first image sensor 115 may generate a specific operation signal and transmit the generated operation signal to the controller 130 (S300). According to an example, the operation signal may be repeatedly transmitted at a predetermined time interval. As the operation signal, any type of signal may be applied as long as it can be received by the controller 130 and whether the first image sensor 115 normally operates can be determined.

The controller 130 may detect whether the first image sensor malfunctions according to whether an operation signal is received from the first image sensor 115 (S310).

The controller 130 may determine whether the operation signal is received by a predetermined time interval. When the operation signal is not received at a determined time, the controller 130 may detect that the first image sensor 115 malfunctions.

When malfunction of the first image sensor 115 is detected, the controller 130 may output the malfunction notification signal 10 on the display unit 150 as illustrated in FIG. 8 (S320). Outputting the malfunction notification signal 10 and displaying the second image data are substantially the same as those described above with reference to FIG. 8, so a detailed description thereof will be omitted.

So far, the first image sensor 115 has been described but the substantially same descriptions may also be applied to the second image sensor 117.

In this manner, the user may quickly recognize whether the image sensor malfunctions and operational stability of the photographing apparatus may be secured by providing a substitute image.

Figure 10:
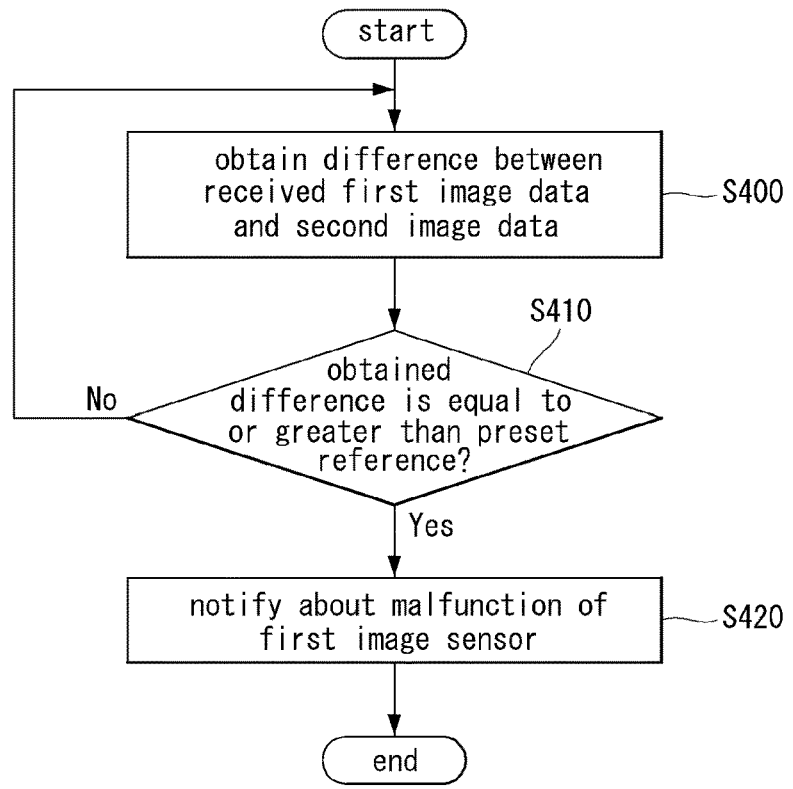
FIG. 10 is a flow chart illustrating a method for detecting malfunction by a difference between first image data and second image data according to an example of the present disclosure.
Figure 11:
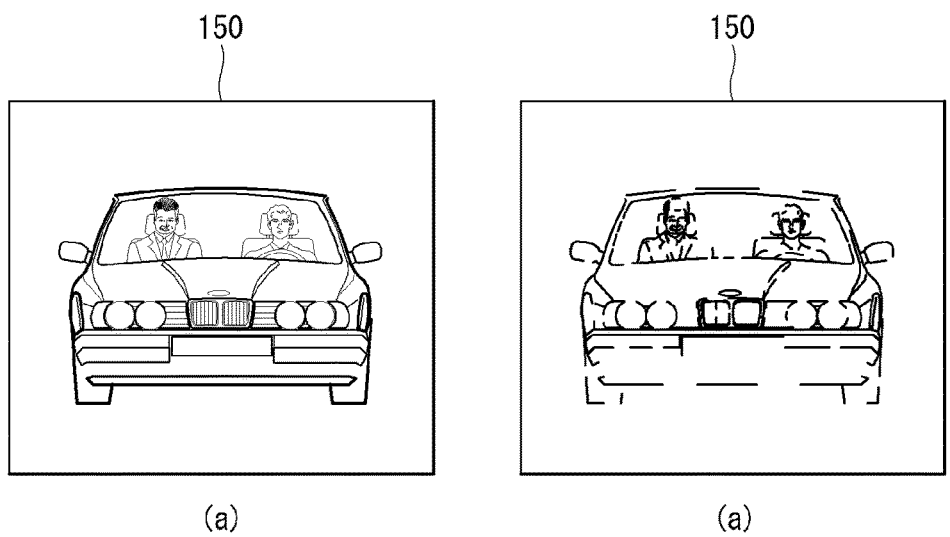
FIGS. 11 and 12 are views illustrating detection of malfunction by a difference between first image data and second image data according to an example of the present disclosure.
Figure 12:
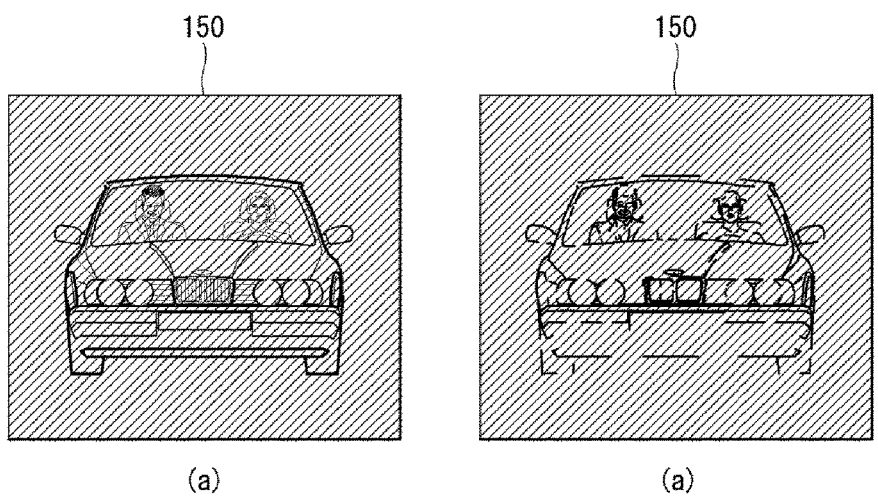

FIG. 10 is a flow chart illustrating a method for detecting malfunction by a difference between first image data and second image data according to an example of the present disclosure. FIGS. 11 and 12 are views illustrating detection of malfunction by a difference between first image data and second image data according to an example of the present disclosure.

The controller 130 may receive first image data and second image data and obtain a difference between the two image data (S400).

According to an example, the controller 130 may obtain a difference between the first image data and the second image data by detecting edges of a subject included in each of the first image data and the second image data.

(a) of FIG. 11 illustrates a case where first image data is displayed on the display unit 150. As illustrated in (b) of FIG. 11, the controller 130 may detects edges of a subject included in the first image data. Here, a method for detecting edges of the subject is not limited to a specific method and any method may be employed as long as it can detect edges of the subject.

Similarly, (a) of FIG. 12 illustrates a case where the second image data is displayed on the display unit 150. As illustrated in (b) of FIG. 12, the controller 130 may detect edges of a subject included in the second image data.

The first image data and the second image data may have different exposure values of the image sensors so they are different in brightness information, or the like, but may include the same subject. Thus, as in the cases of (b) of FIG. 11 and (b) of FIG. 12, the edges of the subjects may be detected to have substantially similar forms. In this manner, when the first image sensor 115 and the second image sensor 117 normally operate, a difference between the first image data and the second image data may be calculated as a very small value.

If, however, the first image sensor 115 does not normally operate, that is, if the first image data is not transmitted as illustrated in FIG. 7, the controller 130 cannot detect the edges as illustrated in (b) of FIG. 11. Thus, when the edges as illustrated in (b) of FIG. 12 are detected from the second image data, a difference between the first image data and the second image data may be calculated as a very great value.

When the difference between the first image data and the second image data is equal to or greater than a preset reference, the controller 130 may detect that the first image sensor 115 malfunctions.

When the difference in edges detected by the controller 130 from the first image data and the second image data is equal to or greater than the preset reference, it may mean that any one of the two image sensors malfunctions. When malfunction of any one image sensor is detected, the controller 130 may output a malfunction notification signal on the display unit 150 as illustrated in FIG. 8 (S420).

Here, however, it may be difficult to determine which of the first image sensor 115 and the second image sensor 117 malfunctions. In case where only a difference in image data is used, a detected difference between edges may be calculated to be equal to or greater than the preset reference although the second image sensor 117 malfunctions.

Thus, according to an example, the controller 180 may output the malfunction notification signal without specifying an image sensor. Here, the controller 130 may also display an indicator for switching the first image data to the second image data displayed on the display unit 150 together. When the first image data displayed on the display unit 150 is normal, the user may delete the malfunction notification signal. Or, when the first image data displayed on the display unit 150 is abnormal, the user may select switching to the second image data.

Or, according to another embodiment, the controller 130 may specify an image sensor by mixedly using another detection scheme described in this disclosure.

So far, calculation of a difference between two images using detection of edges included in subjects respectively included in the first image data and the second image data has been described, but the present disclosure is not limited thereto. A difference between the first image data and the second image data may be calculated by comparing keypoints extracted from two images. Also, any other known algorithm may also be applied as long as it can calculate a difference between two image data.

So far, the first image sensor 115 has been described but the substantially same descriptions may also be applied to the second image sensor 117.

In this manner, the user may quickly recognize whether the image sensor malfunctions and operational stability of the photographing apparatus may be secured by providing a substitute image.

Figure 13:
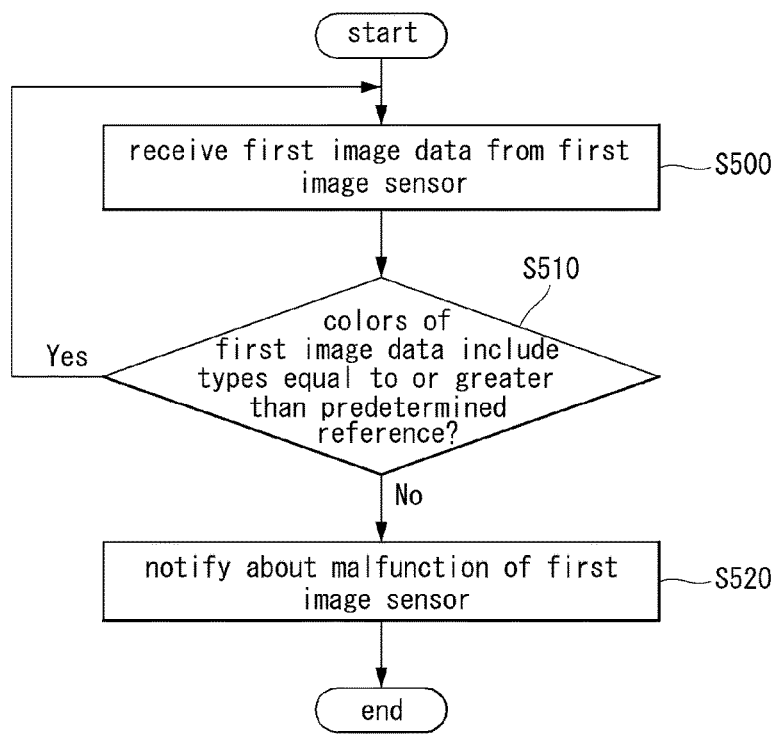
FIG. 13 is a flow chart illustrating a method for detecting malfunction on the basis of a color of first image data according to an example of the present disclosure.
Figure 14:
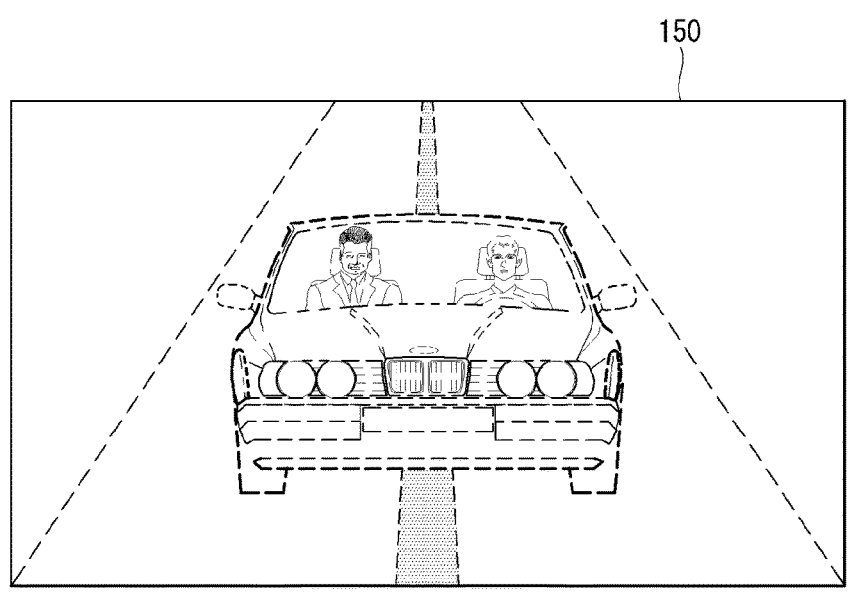
FIG. 14 is a view illustrating detection of malfunction on the basis of a color of first image data according to an example of the present disclosure.

FIG. 13 is a flow chart illustrating a method for detecting malfunction on the basis of a color of first image data according to an example of the present disclosure. FIG. 14 is a view illustrating detection of malfunction on the basis of a color of first image data according to an example of the present disclosure.

Referring to FIG. 13, the controller 130 may receive first image data from the first image sensor 115 (S500). The controller 130 may detect whether the first image sensor malfunctions depending on whether colors of the received first image data include types equal to or greater than predetermined reference (S510).

When the first image sensor 115 normally operates, the first image data may be displayed in various colors by pixels. In FIG. 14, the first image data displayed on the display unit 150 is indicated by the dotted lines. Here, the first image data is displayed in a single color.

According to an example, the predetermined reference for the color type may be two types. Here, when the first image data is displayed only in a single color on the display unit 150 due to malfunction of the first image sensor 115, the controller 130 may determine that the first image sensor 115 malfunctions.

This, however, is merely an example and the present disclosure is not limited thereto. That is, the predetermined reference for the color type may be differently applied. The predetermined reference may also be set to be different as necessary as long as an error regarding color information of the first image data can be detected.

When malfunction of the first image sensor 115 is detected, the controller 130 may output the malfunction notification signal 10 on the display unit 150 as illustrated in FIG. 8 (S520). Outputting the malfunction notification signal 10 and displaying the second image data are substantially the same as those described above with reference to FIG. 8, so a detailed description thereof will be omitted.

So far, the first image sensor 115 has been described but the substantially same descriptions may also be applied to the second image sensor 117.

In this manner, with respect to a color error of the image data due to malfunction of the image sensor, the user may be rapidly provided with a substitute image.

In the above, several embodiments of detecting malfunction of the image sensor have been described. The embodiments of detecting malfunction may be applied alone or at least two or more embodiments may be applied together.

Figure 15:
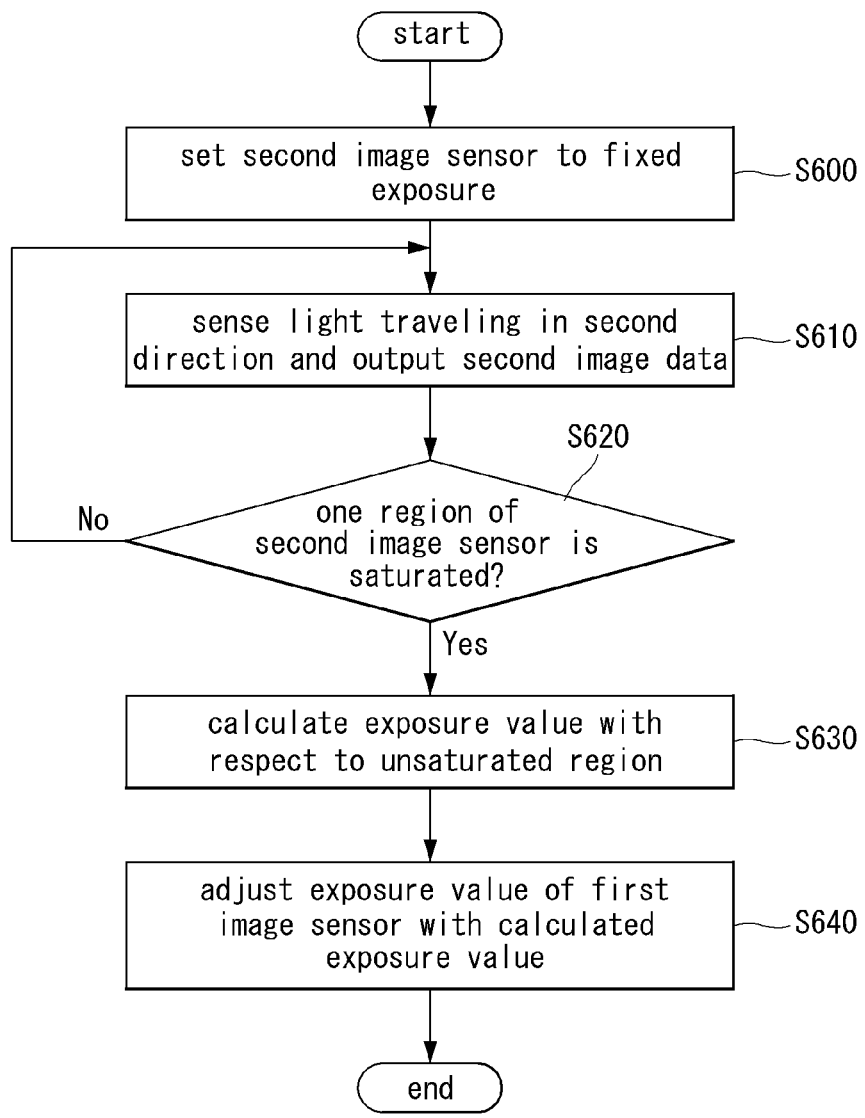
FIG. 15 is a flow chart illustrating a method for adjusting an exposure value of a first image sensor on the basis of brightness information of second image data according to an example of the present disclosure.
Figure 16:
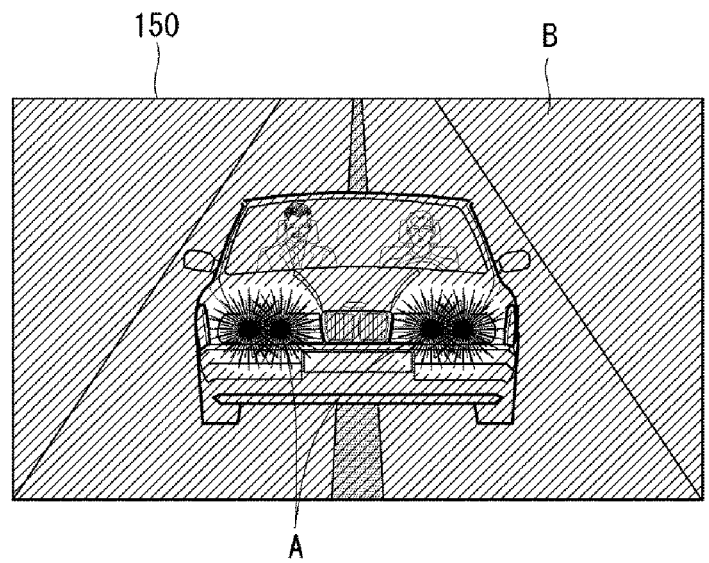
FIGS. 16 and 17 are views illustrating adjustment of an exposure value of a first image sensor on the basis of brightness information of second image data according to an example of the present disclosure.
Figure 17:
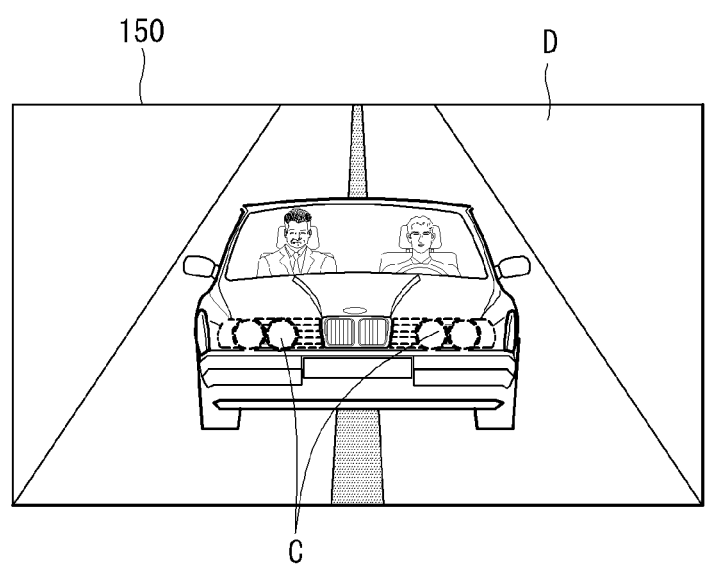

FIG. 15 is a flow chart illustrating a method for adjusting an exposure value of a first image sensor on the basis of brightness information of second image data according to an example of the present disclosure. FIGS. 16 and 17 are views illustrating adjustment of an exposure value of a first image sensor on the basis of brightness information of second image data according to an example of the present disclosure.

Referring to FIG. 15, the second image sensor 117 may be sets to fixed exposure (S600). The second image sensor 117 may sense light traveling in the second direction and output second image data (S610). This is substantially the same as that described above in step S120 of FIG. 3, and thus, any further detailed description thereof will be omitted.

Referring back to FIG. 15, the controller 130 may obtain brightness information from the second image data received from the second image sensor 117 (S620). According to an example, the brightness information may indicate whether an amount of light sensed in at least one region of the first image data has saturated.

Referring to FIG. 16, it is illustrated that a region A is saturated by a headlamp of a vehicle as a subject included in the first image data. In this manner, when the headlamp, light of the sun, and the like, is sensed in the region A of the first image data, an amount of light may be saturated and the region A may not display the subject.

Also, in this case, since the first image sensor 115 is set to automatic exposure, an exposure value is set with respect to the entire region of the first image data. Thus, by reflecting the brightness information of the region A in the saturated state, the controller 130 may determine that the entire region is brighter than a case based on appropriate exposure.

According to the determination result, the controller 130 may lower the exposure value of the first image sensor 115, and in this case, another region B, which is not saturated, of the first image sensor 115 may be displayed to be dark, relative to the case based on appropriate exposure.

Here, since the subjects included in the first image data and the second image data are the same, the region A is displayed, in the second image data, in the same saturated state as that of the first image data. According to an example, the second image data may be set to fixed exposure.

As described above, unlike automatic exposure set to an appropriate exposure value according to average brightness of the entire region, in the case of fixed exposure, exposure values are set to be the same in the entire region. Thus, the controller 130 may calculate brightness information regarding the region B not in a saturated state independently from the saturated region A, from the second image data.

Referring back to FIG. 15, when a region of the second image sensor is saturated, the controller 130 may calculate an appropriate exposure value according to brightness information of a region not in a saturated state (S630).

The controller 130 may calculate the appropriate exposure value in consideration of only the region B, which is not in a saturated state, of the second image data. The appropriate exposure value may refer to an appropriate exposure value when the aforementioned image is captured.

The second image data is obtained by the fixed exposure value, and the controller 130 may calculate the appropriate exposure value regarding a partial specific region from the second image data, without being affected by other regions. A method for calculating the exposure value regarding the partial specific region is not particularly limited and any method may be employed as long as it can calculate the appropriate exposure value. Referring to FIG. 16, the controller 130 may calculate the appropriate exposure value regarding the region B not in a saturated state.

Referring back to FIG. 15, the controller 130 may adjust the exposure value of the first image sensor with the calculated appropriate exposure value (S640).

In order to correct the first image data displayed on the display unit 150, the controller 130 may apply the calculated appropriate exposure value to the first image sensor 115. As described above, the unsaturated region B of FIG. 16 may be displayed to be dark, relative to the case based on the appropriate exposure value, in the first image.

In order to correct this, the controller 130 may adjust the exposure value of the region of the first image sensor 115 corresponding to the region B. Thus, regardless of the saturated region A of the first image data, the region B may be set to the appropriate exposure value. Accordingly, the region B may be obtained as the appropriate exposure value in the first image sensor 115 and displayed (D) on the display unit 150 as illustrated in FIG. 17.

According to an example, with respect to the saturated region A, the controller 130 may adjust sensitivity of a region corresponding to the first image sensor 115 on the basis of brightness information of the second image data. That is, the controller 130 may lower sensitivity of the region of the first image sensor 115 corresponding to the saturated region A. Accordingly, the subject may be Displayed© in the saturated region A as illustrated in FIG. 17.

In the above, the phenomenon in which the image sensor is saturated to appear has been described, but the present disclosure is not limited thereto. For example, in case where brightness information of image data displayed on the display unit 150 is problematic like the case of backlight, the aforementioned contents may be applied in the substantially same manner.

In this manner, the exposure value of the first image sensor is adjusted with the appropriate exposure value calculated on the basis of brightness information obtained from the second image data, the user may be provided with more improved image data.

In the above, adjusting the exposure value of the first image sensor 115 according to the calculated appropriate exposure value has been described, but the present disclosure is not limited thereto. According to an example, the first and second image sensors may further include a brightness adjusting element such as a liquid crystal display (LCD). The controller 180 may adjust brightness of the first image data, or the like, by adjusting the brightness adjusting element on the basis of brightness information of the second image data.

Hereinafter, a method for adjusting an amount of light traveling to the first image sensor 115 using a transmittance adjusting element capable of adjusting transmittance of light among brightness adjusting elements will be described in detail.

Figure 18:
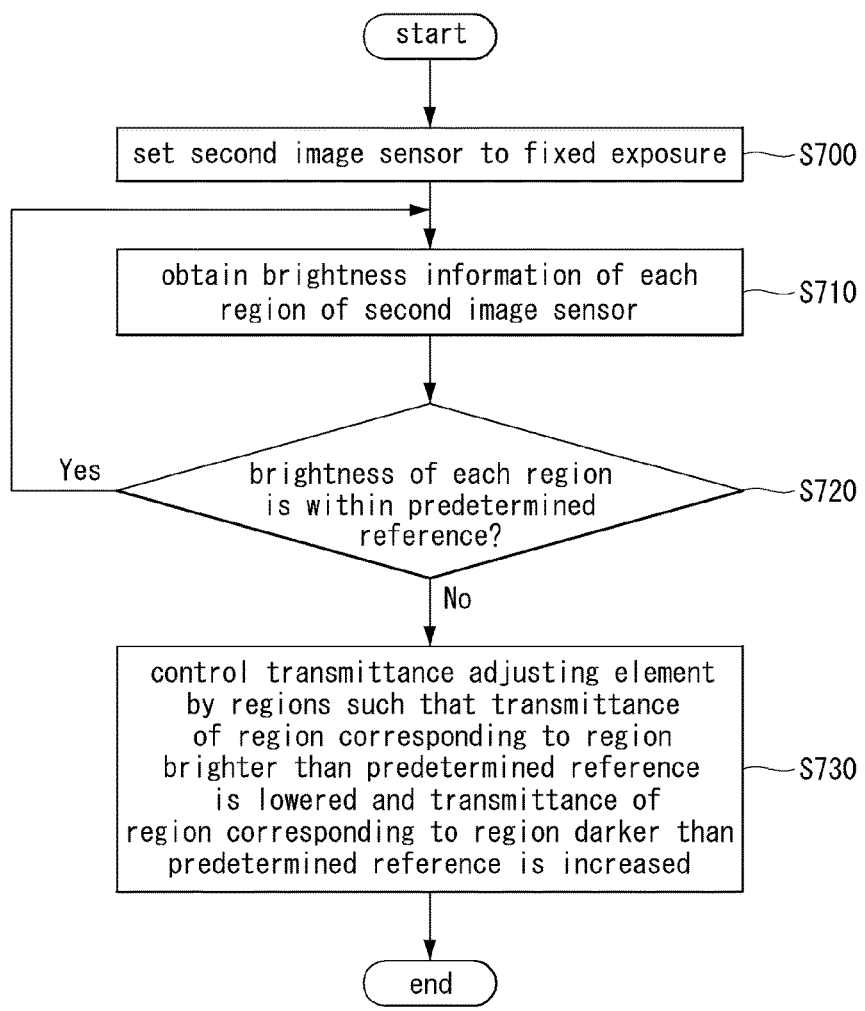
FIG. 18 is a flow chart illustrating a method for controlling a transmittance adjusting element on the basis of brightness information of second image data according to an example of the present disclosure.
Figure 19:
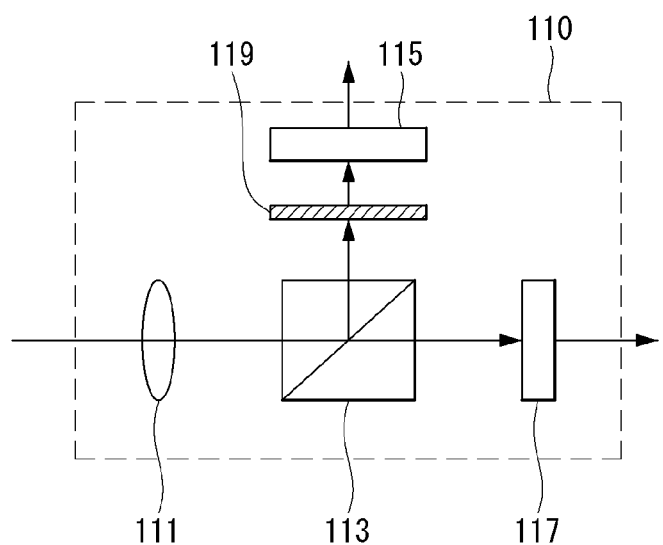
FIG. 19 is a block diagram illustrating an image obtaining unit including a transmittance adjusting element according to an example of the present disclosure.
Figure 20:
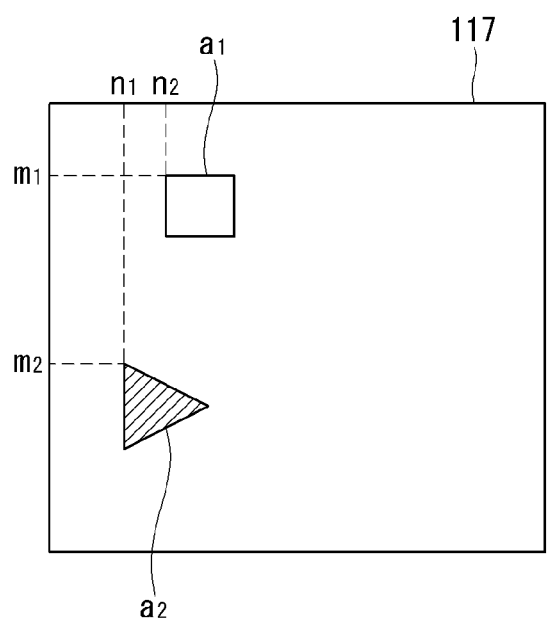
FIGS. 20 and 21 are views illustrating control of a transmittance adjusting element on the basis of brightness information of second image data according to an example of the present disclosure.
Figure 21:
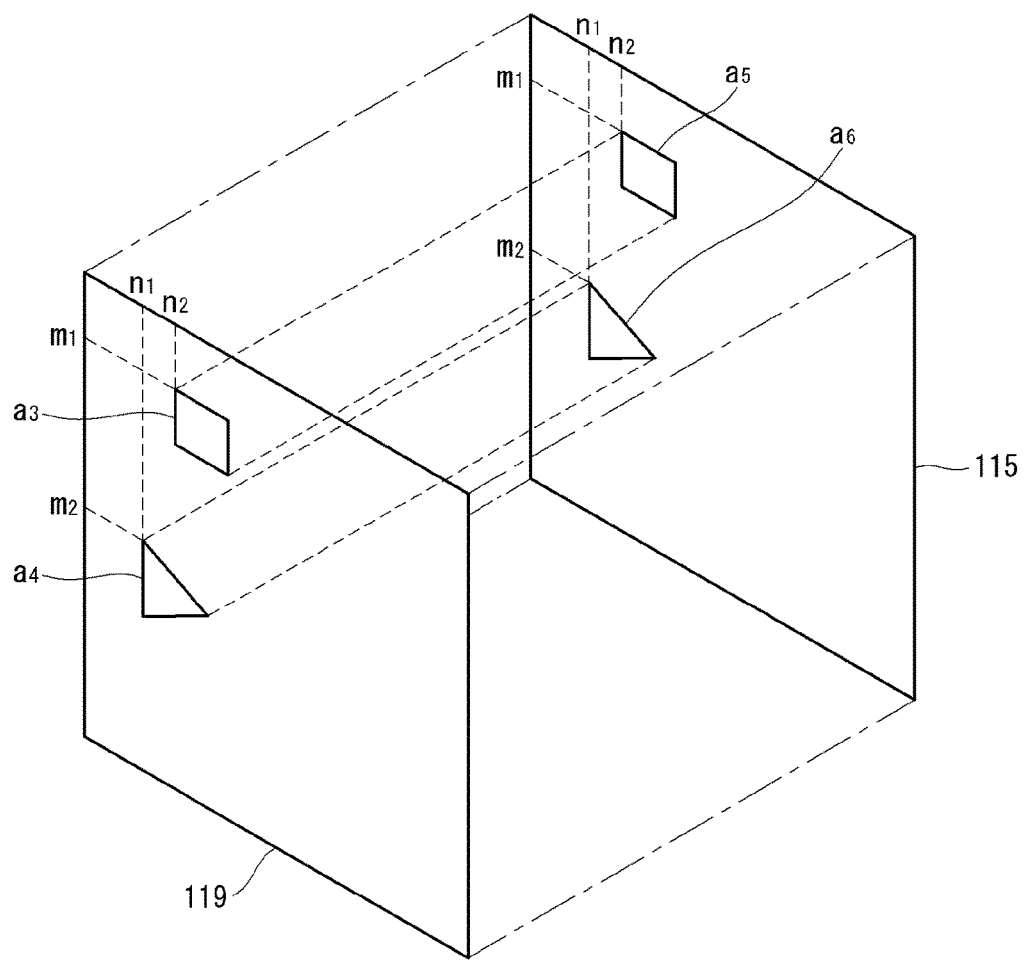

FIG. 18 is a flow chart illustrating a method for controlling a transmittance adjusting element on the basis of brightness information of second image data according to an example of the present disclosure. FIG. 19 is a block diagram illustrating an image obtaining unit including a transmittance adjusting element according to an example of the present disclosure. FIGS. 20 and 21 are views illustrating control of a transmittance adjusting element on the basis of brightness information of second image data according to an example of the present disclosure.

Referring to FIG. 18, the second image sensor 117 may be set to fixed exposure (S700). As illustrated in FIG. 19, the second image sensor 117 may sense light traveling in the second direction and output second image data. This is the same as those described above in steps S600 and S610 of FIG. 15, and thus, a detailed description thereof will be omitted.

Referring back to FIG. 18, the controller 130 may obtain brightness information regarding each region of the second image sensor 117 on the basis of second image data received from the second image sensor 117 (S710).

According to an example, each region may refer to each pixel of the second image data received from the second image sensor 117. Or, each region may refer to a predetermined number of pixels (e.g., four pixels including two pixels in width and two pixels in length) within the second image data. The brightness information may be light amount information in each region.

Referring back to FIG. 18, the controller 130 may determine whether brightness of each region is within a predetermined reference (S720).

According to an example, the predetermined reference may be set to a range of brightness within which the first image data displayed on the display unit 150 can be distinguished. For example, an upper limit of the predetermined reference may be set to be lower than brightness with which each region of the first and second image sensors 115 and 117 is saturated. A lower limit of the predetermined reference may be set to be higher than brightness with which the first image data is difficult to distinguish. This, however, merely an example and the present disclosure is not limited thereto. The upper and lower limits of the predetermined reference may be set to be different as necessary.

In case where brightness of all the regions forming the second image sensor 117 is within the predetermined reference, the first image data may be displayed to be distinguishable on the display unit 150. Thus, the controller 130 may continuously obtain brightness information of each region of the second image sensor, without taking any measures.

Referring back to FIG. 18, if brightness of each region forming the second image sensor 117 is not within the predetermined reference, the controller 130 may control a region of the transmittance adjusting element corresponding to each region by regions (S730).

Referring to FIG. 19, the image obtaining unit 110 may further include a transmittance adjusting element 119 in a path of light traveling in the first direction. According to an example, the transmittance adjusting element 119 may be formed of a material capable of controlling adjustment of transmittance. For example, the transmittance adjusting element 119 may be implemented as a liquid crystal panel of an LCD or a film varied in transmittance according to a control signal. This, however, is merely an example. The transmittance adjusting element 119 is not limited to a specific material and any material may be used as long as it can vary transmittance by regions according to controlling.

The transmittance adjusting element 119 may be positioned such that regions thereof corresponding to regions of the first image sensor 115, respectively. For example, the transmittance adjusting element 119 may be substantially the same in size as the first image sensor 115. This means that the entire area of the transmittance adjusting element 119 is substantially equal to the entire area of the first image sensor 115. However, the present disclosure is not limited thereto and the size of the transmittance adjusting element 119 may be different to the size of the first image sensor 115 as long as brightness of the entire area of the first image sensor 114 may be adjusted by portions by adjusting transmittance of the transmittance adjusting element 119.

Transmittance of the transmittance adjusting element 119 may be changed according to a control signal from the controller 130. Transmittance of the transmittance adjusting element 119 may be adjusted by predetermined regions such that brightness of each portion of the first image data may be adjusted. According to an example, the predetermined region may correspond to pixels of the image sensor. This, however, merely, an example and the present disclosure is not limited thereto. For example, the predetermined region may correspond to a predetermined number of pixels (e.g., four pixels including two pixels in width and two pixels in length).

Referring to FIG. 20, the second image sensor 117 is schematically illustrated. It is assumed that, in the second image sensor 117, a first portion a1 is saturated by an intense light source such as headlamp of an automobile and a second portion a2 is too dark to be distinguishable. The first portion a1 and the second portion a2 each include a plurality of pixels. In FIG. 20, the first portion a1 starts from a pixel at coordinates (n2, m1), and the second portion a2 starts from a pixel at coordinates (n1, m2).

The controller 130 may determine that brightness of the first portion a1 and the second portion a2 is not within the predetermined reference. Since an image sensed in the second image sensor 117 is also sensed in the first image sensor 115, regions of the first image sensor 115 corresponding to the first portion a1 and the second portion a2 may also be in a saturated state or dark.

Referring to FIG. 21, the first image sensor 115 and the transmittance adjusting element 119 provided before the first image sensor 115 are illustrated. An image sensed in the second image sensor 117 illustrated in FIG. 20 is sensed in the same manner also in the first image sensor 115. Thus, a fifth portion a5 corresponds to the first portion a1, and a sixth portion a6 corresponds to the second portion a2.

A third portion a3 of the transmittance adjusting element 119 may correspond to the fifth portion a5 of the first image sensor 115. When transmittance in the third portion a3 of the transmittance adjusting element 119 is adjusted, brightness of the fifth portion a5 of the first image sensor 115 may be adjusted. Also, a fourth portion a4 of the transmittance adjusting element 119 may correspond to the sixth portion a6 of the first image sensor 115. When transmittance in the fourth portion a4 of the transmittance adjusting element 119 is adjusted, brightness in the sixth portion a6 of the first image sensor 115 may be adjusted.

When it is determined that the first portion a1 is saturated, the controller 130 may lower transmittance of the third portion a3. Accordingly, an amount of light passing through the third portion a3 may be reduced, and thus, the saturated state of the fifth portion a5 corresponding to the first portion s 1 may be resolved. According to an example, the controller 130 may lower transmittance of the third portion a3 until brightness of the fifth portion a5 is the same as brightness of other portions.

When it is determined that the second portion a2 is too dark, the controller 130 may increase transmittance of the fourth portion a4. Accordingly, an amount of light passing through the fourth portion a4 may be increased, and thus, the sixth portion corresponding to the second portion a2 may gradually brighten. According to an example, the controller 130 may increase transmittance of the fourth portion a4 until brightness of the sixth portion a6 is the same as brightness of the other portions.

Accordingly, since the first image data output from the first image sensor 115 is corrected by using brightness information obtained through the second image sensor 117, the user may easily recognize even actually too bright or too dark portion in the first image data.

In the above, the transmittance adjusting element 119 provided in a position corresponding to the first image sensor 115 has been described, but the present disclosure is not limited thereto. According to an example, the transmittance adjusting element may be further provided in a position corresponding to the second image sensor 117. Contents related to partial controlling of transmittance described above may also be applied to this case substantially in the same manner FIGS. 22 to 25 are views illustrating displaying image data obtained by synthesizing first image data and second image data when exposure values are adjusted to be contrasted according to an example of the present disclosure.

Figure 22:
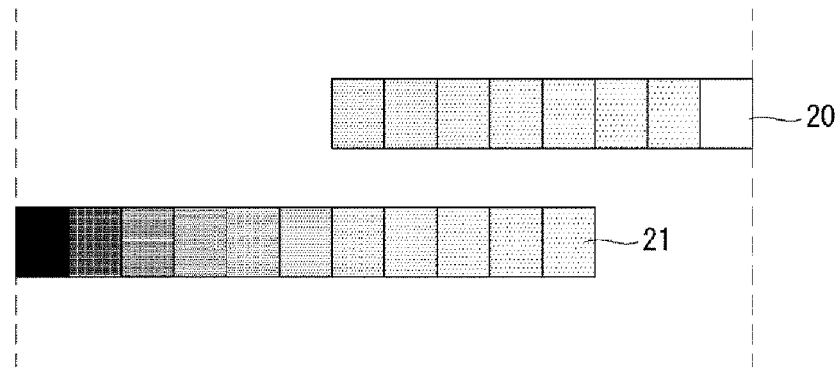
FIGS. 22 to 25 are views illustrating displaying image data obtained by synthesizing first image data and second image data when exposure values are adjusted to be contrasted according to an example of the present disclosure.

In FIG. 22, a range of light and shade distinguishable in two image sensors is illustrated. According to an example, the range of light and shade distinguishable in the second image sensor 117 may be set to 21. This, however, is merely an example and the present disclosure is not limited thereto. That is, the ranges of light and shade distinguishable in the first image sensor 115 and the second image sensor 117 may be set to be different as necessary.

The controller 130 may adjust an exposure value of the first image sensor 115 and an exposure value of the second image sensor to be contrasted. According to an example, the controller 130 may synthesize first image data and second image data in a state in which contrast between the first image sensor 115 and the second image sensor 117 is set to be greatest.

Figure 23:
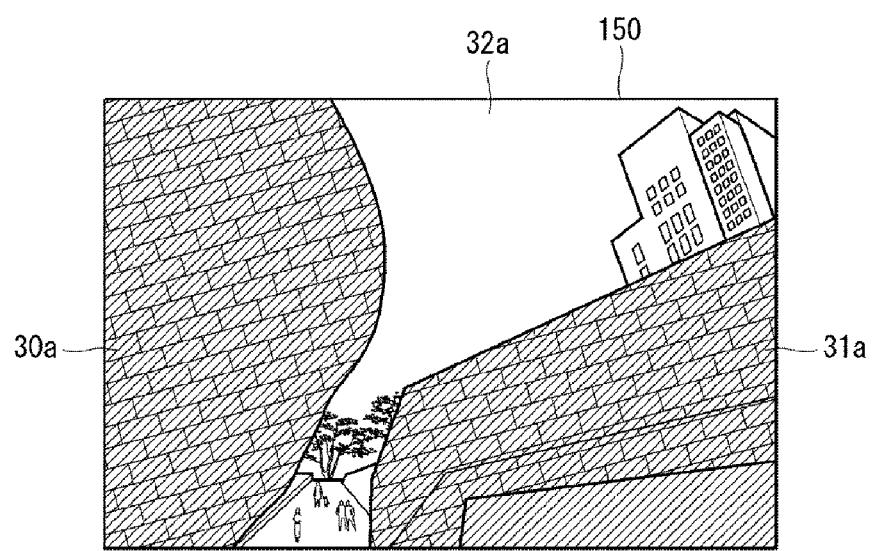

Referring to FIG. 23, first image data obtained by the first image sensor 115 is illustrated. In this case, portions 30a and 30b of a building at a short distance are displayed to be dark, while sky 32a, or the like, at a long distance may be clearly displayed according to an appropriate exposure value.

Figure 24:
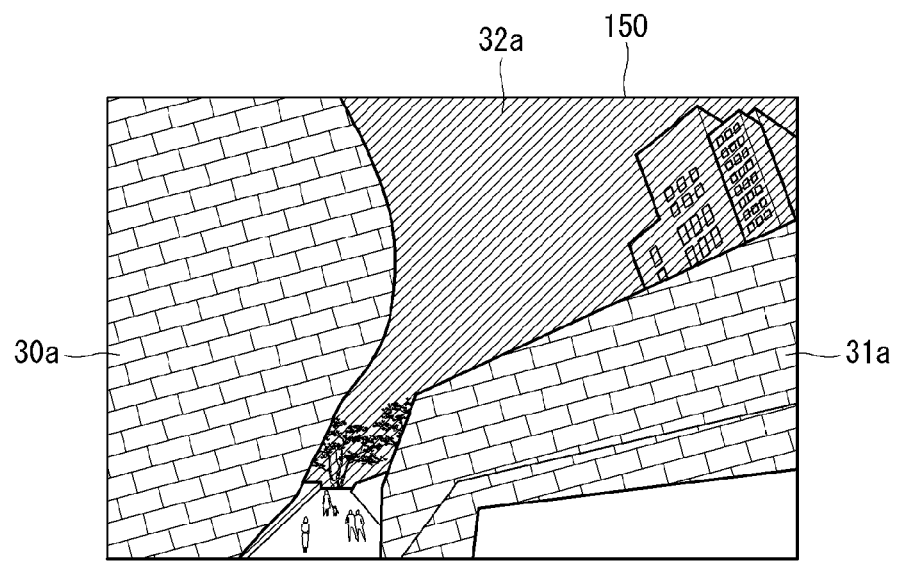

Referring to FIG. 24, second I mage data obtained by the second image sensor 117 is illustrated. Here, the portions 30a and 30b of the building at a short distance are clearly displayed according to an appropriate exposure value, while the sky 32a, or the like, at a long distance may be displayed to be bright according to excessive exposure.

Figure 25:
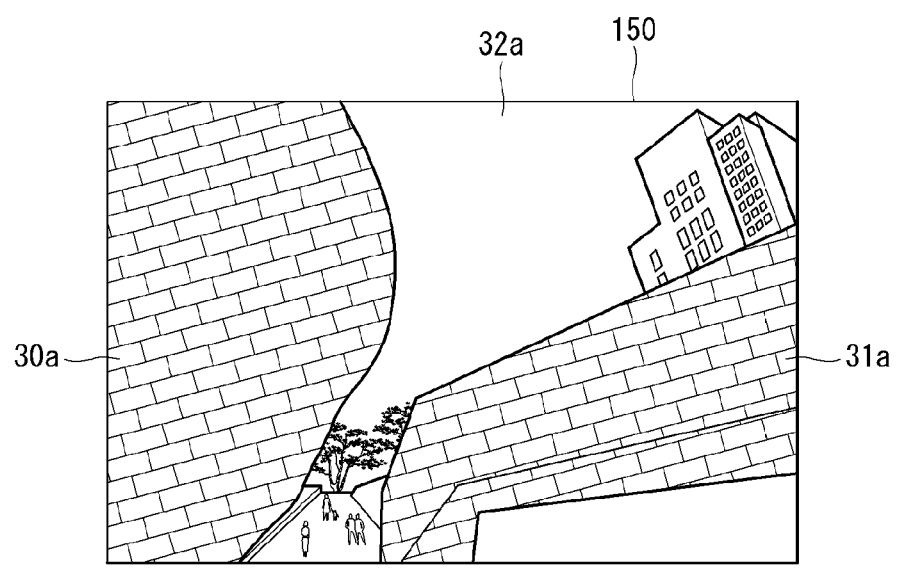

The controller 130 may synthesize the first image data of FIG. 23 and the second image data of FIG. 24 to generate image data of FIG. 25 including only regions clearly displayed according to the appropriate exposure values. Thereafter, the controller 130 may display the synthesized image data on the display unit 150.

In this manner, by adjusting the exposure values of the first image sensor and the second image sensor to be contrasted, the user may be provided with an image according to appropriate exposure values in the entire displayed image.

The present invention described above may be implemented as a computer-readable code in a medium in which a program is recorded. The computer-readable medium includes any type of recording device in which data that can be read by a computer system is stored. The computer-readable medium may be, for example, a hard disk drive (HDD), a solid state disk (SSD), a silicon disk drive (SDD), a ROM, a RAM, a CD-ROM, a magnetic tape, a floppy disk, an optical data storage device, and the like. The computer-readable medium also includes implementations in the form of carrier waves (e.g., transmission via the Internet). Also, the computer may include the controller 180 of the terminal. Thus, the foregoing detailed description should not be interpreted limitedly in every aspect and should be considered to be illustrative. The scope of the present invention should be determined by reasonable interpretations of the attached claims and every modification within the equivalent range are included in the scope of the present invention.

What is claimed is:

1. A photographing apparatus comprising:
a lens;
a beam splitter splitting light passing through the lens into light in a first direction and light in a second direction;
a first image sensor sensing light traveling in the first direction and outputting first image data;
a second image sensor having an exposure value different from that of the first image sensor, sensing light traveling in the second direction, and outputting second image data;
a display unit displaying the first image data; and
a controller correcting pixel values of at least a partial region of the first image data displayed on the display unit on the basis of brightness information obtained from the second image data, and adjusting, when malfunction of the first image sensor is detected, the exposure value of the second image sensor with the exposure value of the first image sensor to display the second image data on the display unit.

2. The photographing apparatus of claim 1, wherein the controller detects malfunction of the first image sensor according to whether the first image data is received.

3. The photographing apparatus of claim 1, wherein the controller detects malfunction of the first image sensor according to whether an operation signal is received from the first image sensor.

4. The photographing apparatus of claim 1, wherein when a difference between the first image data and the second image data is equal to or greater than a preset reference, the controller detects that the first image sensor malfunctions.

5. The photographing apparatus of claim 4, wherein the controller obtains the difference by detecting edges of subjects included in the first image data and the second image data or comparing keypoints of the first image data and the second image data.

6. The photographing apparatus of claim 1, wherein the controller detects malfunction of the first image sensor according to whether colors of the first image data include types of a predetermined reference.

7. The photographing apparatus of claim 1, wherein when malfunction of the first image sensor is detected, the controller outputs a malfunction notification signal on the display unit.

8. The photographing apparatus of claim 1, wherein the controller adjusts the exposure value of the first image sensor on the basis of brightness information obtained from the second image data.

9. The photographing apparatus of claim 1, wherein the controller adjusts the exposure value of the first image sensor and the exposure value of the second image sensor to be contrasted, and synthesize the first image data and the second image data to display synthesized image data on the display unit.

10. A method for controlling a photographing apparatus, the method comprising:
    splitting light passing through a lens into light in a first direction and light in a second direction;
    sensing light traveling in the first direction using the first image sensor and outputting first image data;
    sensing light traveling in the second direction using a second image sensor having an exposure value different from that of the first image sensor, and outputting second image data;
    displaying the first image data on a display unit;
    correcting pixel values of at least a partial region of the first image data displayed on the display unit on the basis of brightness information obtained from the second image data; and
    when malfunction of the first image sensor is detected, adjusting the exposure value of the second image sensor to display the second image data on the display unit.

* * * * *